United States Patent [19]

Evans

[11] Patent Number: 5,135,381
[45] Date of Patent: Aug. 4, 1992

[54] CUTTING AND TRIMMING PLASTIC POT

[75] Inventor: Timothy F. Evans, Melbourne, Australia

[73] Assignee: Jetra Engineering Pty. Limited, Rowville, Australia

[21] Appl. No.: 602,321

[22] PCT Filed: Apr. 12, 1990

[86] PCT No.: PCT/AU90/00143
§ 371 Date: Dec. 4, 1990
§ 102(e) Date: Dec. 4, 1990

[87] PCT Pub. No.: WO90/12678
PCT Pub. Date: Nov. 1, 1990

[30] Foreign Application Priority Data

Apr. 17, 1989 [AU] Australia ................ PJ3699

[51] Int. Cl.5 .................. B29C 43/02; B29C 43/40
[52] U.S. Cl. ..................... 425/308; 425/311; 425/387.1
[58] Field of Search ............ 425/438, 298, 308, 311, 425/387.1, 388; 264/153, 157, 160, 161

[56] References Cited

U.S. PATENT DOCUMENTS

| 2,864,123 | 12/1958 | Gora | 425/298 |
| 2,953,814 | 9/1960 | Mumford | 264/153 |
| 3,240,851 | 3/1966 | Scalora | 264/153 |
| 3,518,334 | 6/1970 | Carrigan et al. | 264/160 |
| 4,243,456 | 1/1981 | Cesano | 264/153 |
| 4,442,064 | 4/1984 | Myers et al. | 264/153 |
| 4,932,856 | 6/1990 | Merklinghaus et al. | 264/153 |

FOREIGN PATENT DOCUMENTS

| 958157 | 2/1957 | Fed. Rep. of Germany . |
| 1157466 | 11/1963 | Fed. Rep. of Germany . |
| 2410781 | 9/1975 | Fed. Rep. of Germany . |
| WO89/03751 | 5/1989 | World Int. Prop. O. . |

Primary Examiner—Willard Hoag
Attorney, Agent, or Firm—Merchant, Gould, Smith, Edell, Welter & Schmidt

[57] ABSTRACT

Apparatus for separating plural molded parts from a web of thermoplastics material, including a lower cutting and trimming die having a plural mandrels each adapted to support a separate part and an zipper die having plural first and second spaced cutting edges movable relative to the mandrels to leave a flange surrounding each pot.

14 Claims, 3 Drawing Sheets

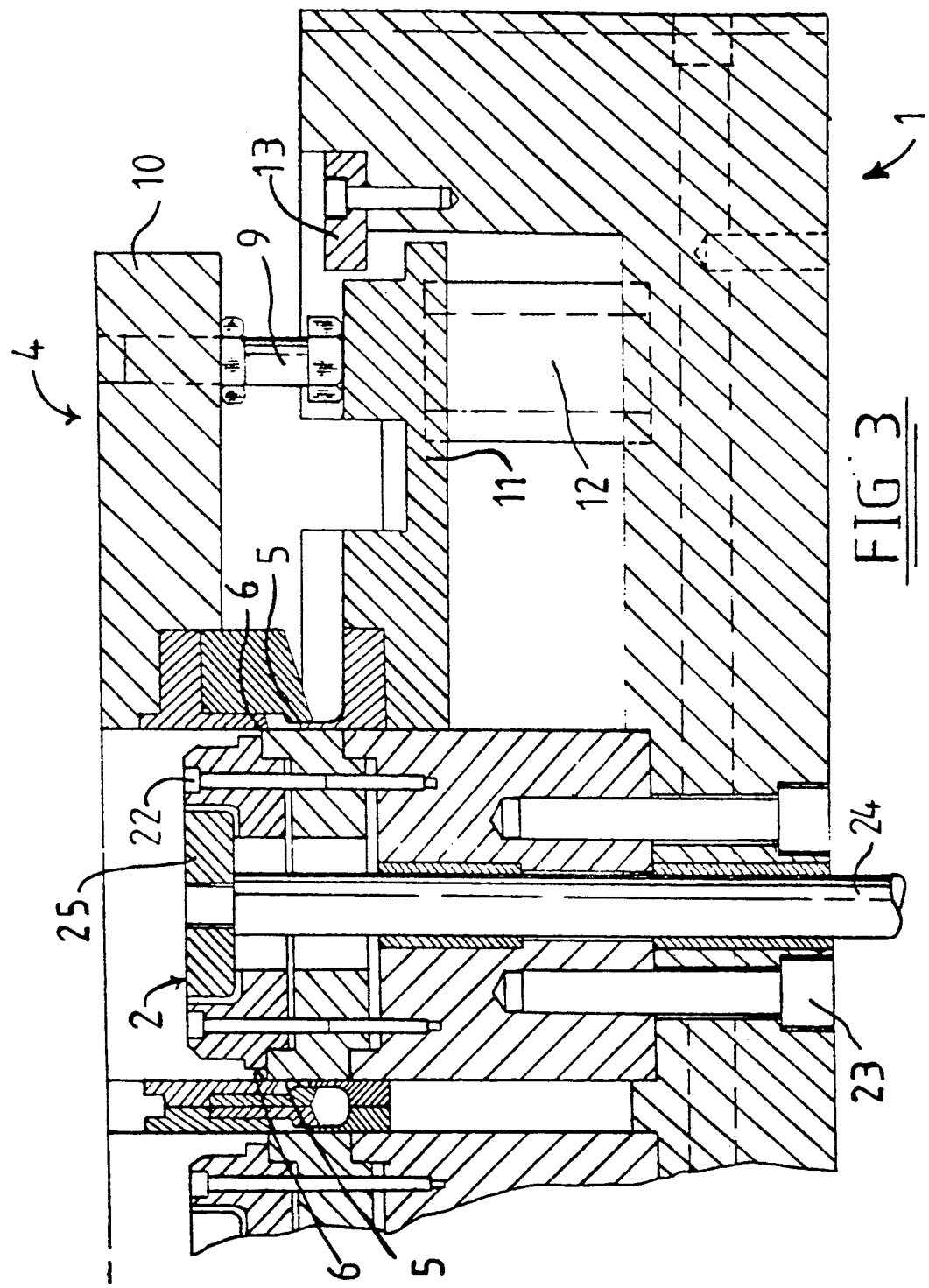

CUTTING AND TRIMMING PLASTIC POT

BACKGROUND OF THE INVENTION

1. Field of the Invention

The present invention relates to the manufacture of plastics containers and is particularly applicable to the manufacture of open top vessels from thermoplastics materials which are suitable for use in food containers.

The forming of shaped articles such as shallow trays, cups and open top vessels from a sheet of thermoplastics material is well known. Techniques such as vacuum forming or thermo forming are widely practised. With the advent of thermoplastics laminates or co-extrusions having at least one layer of a material such as polyvinylidene chloride (PVDC) or ethylene vinyl alcohol (EVOH) providing a barrier to the migration of oxygen through the walls of plastics vessels, thermo formed containers have been increasingly adopted for the packaging of foodstuffs.

A thermo formed container for foodstuffs typically comprises an open topped vessel or pot and a removable closure. Although the wall of the pot may be formed from a material having an oxygen barrier layer to retard spoilage of the contents of the container by oxidation, it is also important that the closure comprises an oxygen barrier, and that the join between closure and pot forms a complete seal whereby to fully seal the contents of the container if foodstuffs or other items subject to spoilage are to be stored in the container.

One preferred closure comprises a metal closure of the ring pull type adapted to be crimped or otherwise secured about an outwardly extending circumferential flange around the open top of the pot. The closure typically has a ring pull tab and a weakened zone and/or one or more score lines suitable to facilitate opening of the container such as by removal of the top from the pot.

The integrity of the seal between the pot and the closure is an important element in the preservation of the contents of the container. It will be appreciated that any ingress of oxygen through a faulty or misaligned closure may result in spoilage of the contents.

The pot for such a thermo formed container is typically formed by taking a band of hot thermoplastics material and passing it to a thermo former where a plurality of pots is formed in the band and upon cooling the pots are cut from the band whereby to provide a plurality of pots and a remaining web which can be recycled.

Unless the band of thermoplastics material is very accurately located at the cutting knives, it has been found that the outwardly extending flange may not be symmetrical once the pot is separated from the web. Defects in the flange such as those caused by misalignment of the web with the knives may result in an imperfect seal. Such an imperfect seal can result in the ingress of oxygen and spoilage of the contents when the container is used for carrying food.

2. Discussion of the Prior Art.

One proposal for forming a more symmetrical flange has been the trim in place technique in which plastics articles are separated from the surrounding web within the moulding die. Examples of the trim in place technique are shown in U.S. Pat. Nos. 2,522,956 (Middleton), 3,173,174 (Edwards) and 4,755,129 (Baker et al).

The trim in place technique however has problems relating to excessive wear of cutting edges operating at elevated temperatures and the need to suspend moulding operations when replacing cutting edges. In addition uneven contraction during cooling can result in pots formed by trim in place techniques being unsuitable to receive metal closures.

U.S. Pat. Nos. 4,308,005 (Zundel) and 4,442,064 (Myers et al) both describe an apparatus in which the pots are cut from the web in a separate step. In Zundel the conveyor of the cutting press is drivingly connected with the conveyor of the thermoforming machine. However, the strip steel cutters disclosed are unsuitable for providing a flange sufficiently symmetrical to receive a metal closure.

Myers et al relates to the precise trimming of thermoformed articles from a plastics web. The disclosure teaches the loose aligning of formed articles with article punches, isolating the articles from each other so that they exactly register themselves with the punches in a selected sequence and precisely trimming the pots from the plastic web. However, to achieve this Myers et al teaches initially shearing the web in the machine direction before separately indexing each of a plurality of strips containing one row of thermoformed articles. Each article is then separated from all following articles in the remainder of the strip by an across machine shearing operation.

However, the present invention by using continuous cutting surfaces simplifies the handling steps by avoiding separate separation in the machine and across-machine directions and is suitable for the efficient cutting and trimming of a number of rows of pots simultaneously.

SUMMARY OF THE INVENTION

It is accordingly an object of the present invention to provide in alternative embodiments a method and an apparatus suitable for forming open top pots for receiving a closure having a rolled edge whereby to form a container for food which alleviate the difficulties outlined above as having been experienced in relation to the formation and use of known prior art pots.

Accordingly the present invention provides, in one embodiment, an apparatus suitable for separating a pot from a web of thermoplastics material and forming a substantially symmetrical flange thereon. The apparatus comprises a cutting and trimming die having lower die means including a mandrel for supporting the pot and upper die means incorporating first and second spaced cutting edges. The edges are movable with respect to the mandrel wherein the first cutting edge is adapted for cooperating with a first cutting member mounted on the lower die means whereby to cut said pot from said web leaving a flange surrounding the pot and thereby facilitate the accurate location of the pot on the mandrel. A portion of the lower die means including said first cutting, member is movable relative to the mandrel to enable a second cutting edge of the upper die means to cooperate with a second cutting member mounted on the lower die means whereby to trim the flange so forming a substantially symmetrical flange on the pot.

The present invention also provides in another preferred embodiment a method suitable for separating a pot from a web of thermoplastics material and forming a substantially symmetrical flange thereon. The method comprises the steps of positioning the pot on a mandrel within a cutting and trimming die, cutting the pot from the web using a first cutting edge movable with respect to the mandrel to thereby facilitate the accurate location of the pot on the mandrel, and without disengaging the pot from the mandrel, forming a substantially symmetrical flange on the pot by the action of a second cutting edge also movable with respect to the mandrel.

In yet another embodiment the present invention provides a method for forming an open top pot having a symmetrical outwardly extending flange adapted for receiving a rolled edge of a metal closure. The method comprises the steps of passing a band of thermoplastics material through a heating device to soften the material, forming a plurality of pots in the softened material at least one the pots having an outwardly extending flange and being connected to at least one other of the pots by a web of material. The pot is mounted on a mandrel, cut from the web by the shearing action of a first cutting edge movable with respect to the mandrel co-operating with a first cutting member whereby to cut said pot from said web and thereby facilitate the accurate location of the pot on the mandrel and trimmed by the shearing action of a second cutting edge. The second cutting edge is movable with respect to the mandrel and co-operates with a second cutting surface whereby to form a pot having a substantially symmetrical outwardly extending flange. The pot is then removed from the mandrel.

The mandrel of the lower die means provided in accordance with the present invention preferably comprises a member of a shape complementary to that of the inner profile of the pot being worked. The upper portion of the mandrel is preferably tapered, chamfered or otherwise shaped whereby to facilitate the location of a pot on the mandrel. The mandrel may be adapted to receive only a portion of the pot thereover. Preferably less than one half of the length of a pot and most preferably approximately one third thereof receives the mandrel therein.

Preferably the mandrel is mounted so as to remain substantially stationary within the apparatus of the invention. At least a portion of the lower die means may be movable and preferably slidably movable with respect to said mandrel.

Preferably the shape and configuration of the mandrel is such as to form a snug fit within a pot mounted thereon whereby the mandrel may support and locate the pot during cutting and trimming thereof.

The lower die means may include a pair of cutting surfaces. A first cutting surface may be adapted for cooperating with a first cutting edge of the upper die means whereby to cut the pot from the web and a second cutting surface may be adapted for cooperating with a second cutting edge of the upper die means whereby to trim the marginal edge of the pot whereby to form a substantially symmetrical outwardly extending flange thereon.

The cutting and trimming actions of a die provided in accordance with the present invention are preferably both performed by a cutting edge moving past a cooperating cutting surface in a shearing action.

In one particularly preferred arrangement the second cutting surface comprises an outer surface of the mandrel.

At least the first cutting surface of the lower die means is preferably removably mounted in a block of the lower die means whereby to facilitate removal rapid replacement of said surface.

A table comprising at least a portion of the lower die means adapted and arranged for slidable movement relative to the mandrel may be provided in accordance with the present invention. In a particularly preferred arrangement compression means such as a spring or other compression material is provided for urging the table of the lower die means towards a first position in which the first cutting surface is positioned for co-operation with the first cutting edge of the upper die means. Stop means may be provided for the table to abut under the action of the urging means when the said lower die means is in the first cutting position.

It is preferred that the apparatus provided according to the present invention is a multi-cavity apparatus adapted for simultaneous cutting and subsequently simultaneous trimming of a plurality of pots. The apparatus may be provided with a plurality of mandrels, cutting surfaces, and associated cutting edges whereby to simultaneously cut a plurality of pots from the web and form a substantially symmetrical flange on each of said pots.

The lower die means provided in accordance with the present invention may also include removal means to facilitate removal of the web from the lower die means following cutting. The removal means may comprise a rod, pin, block or other member adapted to urge web draped over said mandrel after one or more pots are cut therefrom, out of engagement with the lower die means.

In one preferred arrangement the removal means comprises a push rod which is recessed into the lower die means and biased toward the upper die means by the action of a spring or other compression means. In use the web may push against the action of the compression means as the die closes for cutting and trimming and the spring action may urge web separated from the pots out of engagement with the lower die means as the die is opened.

Where a multi-cavity apparatus is provided for simultaneous treatment of a plurality of pots it has been found convenient for such push rods to be positioned between adjacent mandrels.

Removal means may be provided in accordance with the invention to facilitate removal of the web from the die. The removal means may comprise a stripper plate adapted to pass under the web and after the cutting and trimming steps have been carried out to raise the web to a position clear of the mandrel. Once the web is clear of the mandrel and the other components of the upper and lower die means it may be removed from the die. In a continuous line, such removal from the die may typically occur as the following pots are indexed forward for cutting and trimming.

In one preferred embodiment according to the invention the upper die means includes a cavity for receiving the body of a pot. The walls of the cavity are preferably wider towards the cavity mouth than towards the cavity interior. The construction and arrangement is preferably such that at the first cutting position there is a discernible clearance between the outer walls of the pot and the inner walls of the cavity. The cavity walls may progressively taper inwardly. More preferably the cavity walls define a wider body portion narrowing via a tapered shoulder portion to a narrowed neck portion.

The arrangement may be such that as the upper die means moves from the first cutting position to the second trimming position the pot moves more deeply into the cavity. At the second trimming position the internal walls of the cavity preferably provide a snug fit with at least a portion of the walls of the pot whereby to accurately locate and position the pot with respect to the second cutting edge and second cutting surface. Such dual location and positioning of the pot by the mandrel and cavity walls provides for very accurate location whereby to facilitate the second trimming step providing a substantially symmetrical flange extending outwardly with respect to the walls of the pot and is particularly suitable for use in the cutting and trimming of relatively deep pots.

Most preferably the construction and arrangement in this embodiment is such that at the first cutting position the pot is situated in the wider body portion of the cavity and at the second trimming position at least a portion of the pot projects into the narrower neck portion of the cavity and forms a snug fit therein.

The first and second cutting edges provided according to the invention are preferably removably mounted in a block of the upper die means whereby to facilitate rapid replacement of said cutting edges.

The upper die means may also include one or more spacers adapted for controlling the minimal space between the upper and lower die means. The spacers may be in the form of bolts which are lockable in a preferred position. The spacers may be adapted for contacting the table of the lower die means when the minimum desired separation is achieved and as further movement of the upper die means takes place with respect to said mandrel the spacers may act to move said lower die means against the action of the urging means and away from the stop means.

The first cutting edge of the upper die means may cooperate at a first cutting position with the first cutting surface of the lower die means whereby to cut the pot from the surrounding web and the second cutting edge of the upper die means may cooperate with the second cutting surface of the lower die means at a second trimming position whereby to trim said pot whereby to form a substantially symmetrical outwardly extending flange. The first and second cutting edges preferably operate sequentially.

As the upper die means moves with respect to a mandrel having a pot receiving cavity from the first cutting position to the second trimming position, the pot is urged further into the cavity. After the first and second cutting actions the pot may be wedged in the neck portion of the cavity of the upper die means. After completion of the first cutting and second trimming step the cutting and trimming die of the invention may operate to reverse the direction of movement of the upper die means with respect to the mandrel whereby to open the die. A push rod may be provided inside the cavity of the upper die means whereby to push against the pot whereby to urge the pot out of the cavity as the die is opened.

Means may also be provided in the upper die means for facilitating removal of the trimmed flange element separated from the outwardly extending flange of the pot during the second trimming step. An air jet may be provided in the vicinity of the second cutting edge whereby to facilitate removal of the flange element from the upper die means.

In another preferred embodiment according to the present invention the pot is held in position on the mandrel during both cutting and trimming steps without any additional support from a pot receiving cavity as described above. This arrangement has been found to be particularly suitable for use in the processing of relatively shallow pots.

In this arrangement the mandrel may incorporate one or more vacuum channels. The channels may communicate with the interior of a pot positioned over the mandrel whereby a vacuum, i.e. a pressure less than ambient, is applied to the interior of the pot which is thereby more securely positioned over the mandrel.

After cutting and trimming removal of the pot from the mandrel may be facilitated by reversing the vacuum in the vacuum channels to a pressure greater than ambient.

Removal of a cut and trimmed pot may also be facilitated by providing said mandrel with a push rod. The push rod may act by extending from the die whereby to contact the base of the pot to facilitate removal thereof from the mandrel. The push rod may include a disc-like head adapted to contact the interior of the pot. The push rod may be mounted in a passage in the mandrel.

The vacuum channels may pass through the push rod and in particular may extend through the head of the push rod. Preferably there is clearance between the push rod and passage with the separation between the push rod and passage with the separation acting as a vacuum channel.

Preferably the travel of the push rod is sufficient to facilitate ejection of the pot through the upper die.

The apparatus provided in accordance with the present invention may further include clearance means to facilitate removal of a pot from the apparatus after completion of the second trimming step Such clearance means may comprise an arm, an air jet or other means for sweeping a pot out of registry with its associated mandrel. The pot may be fully removed from the apparatus of the invention by the clearance means or may be carried from the apparatus by the web as it indexes forward Removal may be effected from between the upper and lower die means after opening thereof or from above the upper die means as described herein.

A particularly preferred embodiment of the invention will now be described in relation to the drawings.

BRIEF DESCRIPTION OF THE DRAWINGS

In the drawings

FIG. 3 comprises a cross-sectional view of a portion of a multi-cavity die according to another preferred embodiment of the invention at a second trimming position.

DETAILED DESCRIPTION

Figure 1:
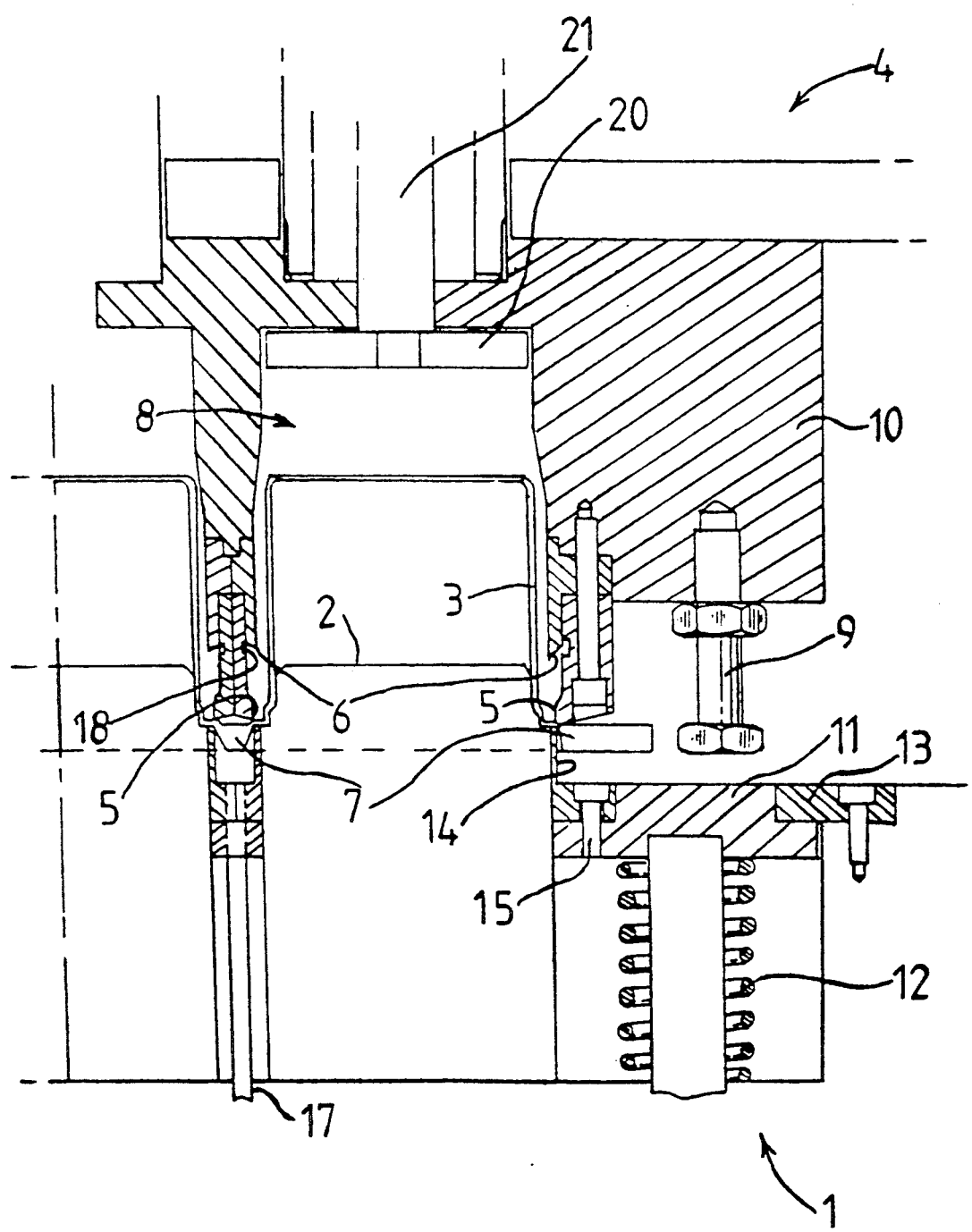
FIG. 1 comprises a cross-sectional view of a portion of a multi-cavity die according to one preferred embodiment of the invention at a first cutting position.
Figure 2:
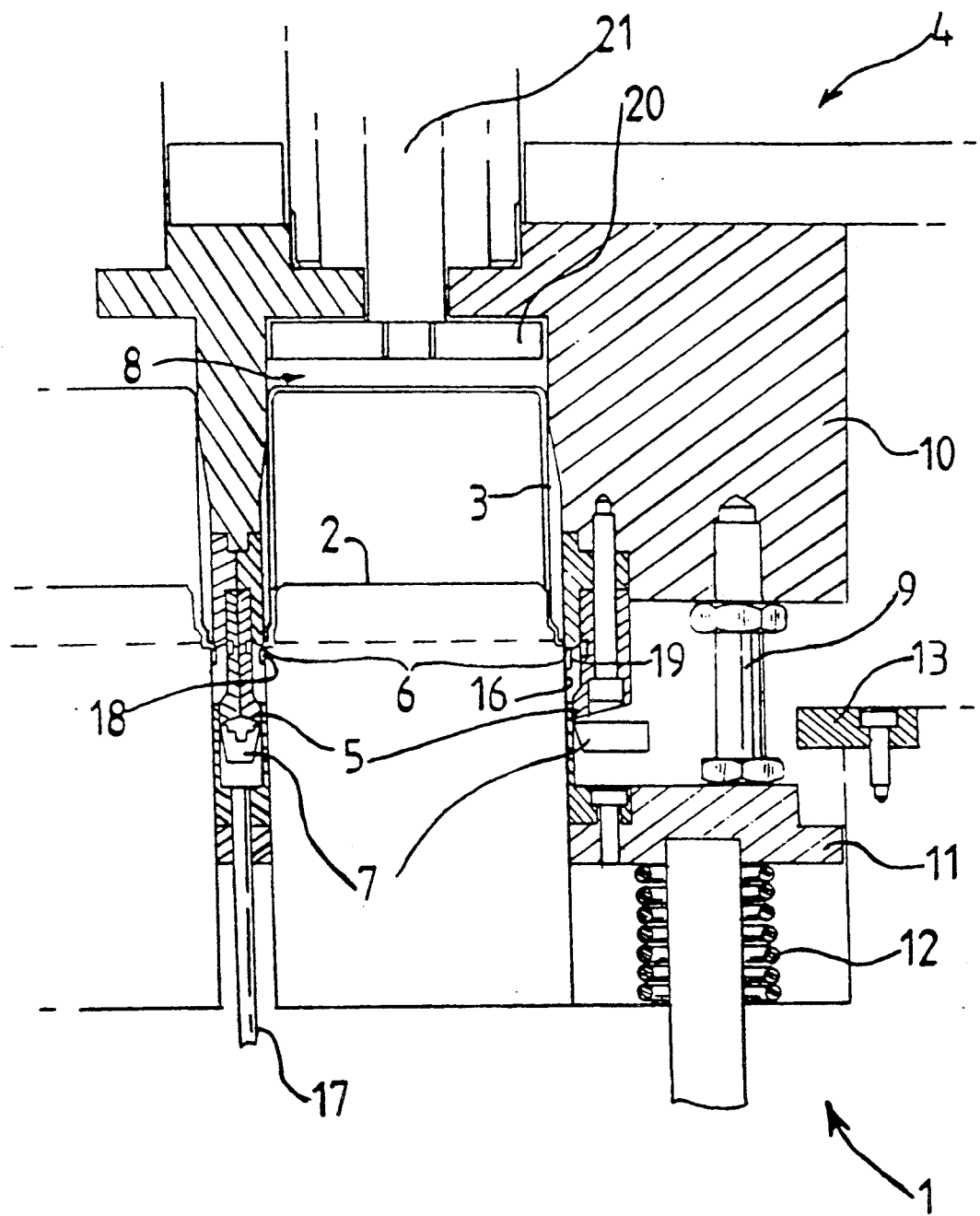
FIG. 2 comprises a cross-sectional view of the embodiment of FIG. 1 at a second trimming position.

As depicted in FIG. 1, the apparatus provided according to the present invention comprises a cutting and trimming die having lower die means 1 including a mandrel 2 for supporting a pot 3 and upper die means 4 incorporating a first cutting edge 5 and a second cutting edge 6. Second cutting edge 6 is positioned upwardly and inwardly of first cutting edge 5 whereby in operation first cutting edge 5 acts to sever pot 3 from web 7 by the downward movement of the upper die means 4 with respect to mandrel 2. As shown in FIG. 2, continued downward movement of upper die means 4 with respect to mandrel 2 urges pot 3 into engagement with the narrower neck portion of cavity 8.

At the second trimming position shown in FIG. 2, pot 3 is firmly held in position by the inner walls of the neck portion of cavity 8 and by mandrel 2.

Upper die means 4 includes spacer member 9 comprising a bolt and lock nut adjustably mounted in block 10 of upper die means 4. As upper die means 4 continues downwardly beyond the first cutting position shown in FIG. 1, spacer 9 contacts table 11 of lower die means 1.

Prior to contact between spacer 9 and table 11, compression means 12 preferably in the form of coil spring as shown or other compression means such as compression material urges table 11 upwardly. The extent of upward movement of table 11 is checked by stop means 13.

First cutting surface 14 is removably mounted via fastener 15 to table 11 of lower die means 1. First cutting surface 14 cooperates with first cutting edge 5 in separating pot 3 from web 7.

When the minimum distance set by spacer 9 for separating upper die means 4 from lower die means 1 is reached during downward movement of upper die means 1, spacer 9 contacts table 11 and urges table 11 and first cutting surface 14 downwardly against the action of compression means 12.

As mandrel 2 remains stationary during downward movement of upper die means 4, pot 3 may be considered as moving upwardly relative to upper die means 4 into the narrowed neck portion of cavity 8.

At the second trimming position shown in FIG. 2, second cutting edge 6 acts against second cutting surface 16 whereby to trim flange element 19 comprising a ring of plastics material, from the outwardly extending flange of pot 3 whereby to form a substantially symmetrical outwardly extending flange on pot 3.

After trimming at the second cutting position the die is opened by upper die means 4 moving upwardly with respect to mandrel 2. Under the action of compression means 12 table 11 of lower die means 1 moves upwardly with upper die means 4 until the maximum upward position of table 11 is reached by engaging stop 13. Upper die means 4 continues to move upwardly whereby to open the die.

Removal pin 17 is provided in lower die means 1 to move upwardly as the die is opened whereby to urge web 7 upwardly out of engagement with first cutting surface 14.

Although not shown in the drawings, one or more fingers may be provided in accordance with the invention to facilitate the upward movement of web 7 to clear mandrel 2 whereby to move the remaining web out of the die as the following pots are indexed forward for engagement with the mandrel.

As upper die means 4 moves upwardly to open the die, pot 3 initially remains wedged in cavity 8 as the mouth of pot 3 is freed from mandrel 2.

A jet of air may be emitted from orifice 18 whereby to free flange element 19 trimmed from the outwardly extending flange of pot 3 by the second trimming step. The jet of air issuing from orifice 18 is preferably arranged whereby to resist flange element 19 passing over mandrel 2. Preferably flange element 19 is removed from the die as web 7 indexes forward.

Upper die means 4 includes piston 20 which may be forced downwardly by post 21 whereby to free pot 3 from cavity 8 for removal from the die.

Although not shown in the drawings, the apparatus provided by the invention may include clearance means to facilitate removal of pot 3 from the apparatus of the invention as the die is opened.

The present invention is suitable for use in a high speed production and/or packaging line whereby the first cutting means operates to remove the pot from the web thereby enabling accurate location of the pot by the combined action of mandrel 3 and the neck portion of cavity 8. Accurate location of pot 3 facilitates accurate trimming of the outwardly extending flange as required for pots to receive full open closures adapted to be rolled over the outwardly extending flange of a pot.

In the alternative embodiment depicted in FIG. 3 many of the above described features are constructed and arranged in the manner described above in relation to FIGS. 1 and 2 and such features have been similarly numbered.

As shown in FIG. 3, the apparatus provided according to the present invention comprises a cutting and trimming die having lower die means 1 including a mandrel 2 for supporting a pot (not shown) and upper die means 4. Upper die means 4 incorporates a first cutting edge 5 and a second cutting edge 6. Second cutting edge 6 is positioned upwardly and inwardly of first cutting edge 5 whereby in operation first cutting edge 5 acts to sever the pot from the surrounding web by the downward movement of the upper die means 4 with respect to mandrel 2.

Upper die means 4 includes spacer member 9 comprising a bolt and lock nut adjustably mounted in block 10 of upper die means 4. As upper die means 4 continues downwardly beyond the first cutting position, spacer 9 contacts table 11 of lower die means 1.

Prior to contact between spacer 9 and table 11, compression means 12 such as a compression material or coil spring urges table 11 upwardly. The extent of upward movement of table 11 is checked by stop means 13.

When the minimum distance set by spacer 9 for separating upper die means 4 from lower die means 1 is reached during downward movement of upper die means 1, spacer 9 contacts table 11 and urges table 11 downwardly against the action of compression means 12.

As mandrel 2 remains stationary during downward movement of upper die means 4, the pot may be considered as moving upwardly relative to upper die means 4.

Mandrel 2 may be formed from separate components held together by securing means 22. This facilitates replacement of worn components and the use of materials having specific characteristics, such as high tensile strength, where necessary. Mounting means 23 mount mandrel 2 in lower die means 1.

Mandrel 2 of the embodiment shown in FIG. 3 includes push rod 24 having a disc-like head 25 mounted thereon. Push rod 24 is mounted in a passage extending through mandrel 2 with the clearance gap between the passage walls and push rod 24 acting as a vacuum channel whereby a vacuum i.e. a pressure less than ambient, may be applied to the interior of a pot mounted over mandrel 2 to more securely position the pot thereover.

To eject a cut and trimmed pot from the preferred embodiment shown in FIG. 3, push rod 24 may extend upwardly with respect to mandrel 2 whereby head 25 contacts the inner surface of the pot and continued upward movement releases engagement between the pot and mandrel 2. This action may facilitate removal of the pot from the apparatus shown in FIG. 3 via the top of upper die means 4.

Following removal of the pot from the apparatus, upper die means 4 may move upwardly to open the die and the web may be removed from the die as already described in relation to the embodiment of FIGS. 1 and 2.

The preferred embodiment shown in FIG. 3 is also suitable for use in a high speed production and/or packaging line with the combined action of the shaped mandrel and the applied vacuum facilitating accurate location of the pot and hence accurate trimming of the outwardly extending flange.

Although it has been convenient to refer in the detailed description of the drawings to the upward and downward directions, it is to be appreciated that the invention is not restricted to operation in the orientation shown in the drawings. Accordingly, the use of such terms is to be seen as merely convenient for describing the invention but as not in any way restrictive of the ambit or scope of the invention.

In a typical arrangement for forming pots from thermoplastics materials a thermo forming process may form one part of an overall packaging line or pots may be separately produced. In either case the thermo forming process may comprise means for passing a band of thermoplastics material through an open or other heating means whereby to soften the thermoplastics band.

As is known in the art a large number of thermoplastics materials are suitable for the thermo forming process. Materials such as PVC and polystyrene having long been known as having suitable properties for undergoing thermo forming and materials such as polypropylene and high density polyethylene have been known as having suitable properties for the formation of containers. More recently it has been found that laminates and co-extrusions of polypropylene or high density polyethylene which incorporate at least one layer of an oxygen barrier material such as ethylene vinyl alcohol or polyvinylidene chloride are particularly suitable for use in the production of thermo formed containers for food packaging.

After passing through the oven whereby to soften the band of thermoplastics material, the band is passed to a thermo former. The thermo former typically comprises a multi-cavity machine having inter-relating dies and plungers whereby at least one row of pots extending laterally across the thermoplastic band is formed with a single relative movement of a plurality of dies and plungers. After forming, the dies and plungers disengage to release the band which may then be moved forward whereby further lateral rows of pots may be formed in the band by relative movement of the dies and plungers.

When the present invention is integrated with such a high speed production line, the cooled pots and interconnecting web are indexed forward to position the band for forming a further series of pots at the forming station. The apparatus provided by the present invention may be integrated with the line whereby pots and interconnecting web enter the die as the band is indexed forward, the die closes and the first cutting step and second trimming step are carried out in a single stroke of the die. Thereafter, the die is opened and after removal of the web, flange element and pot from the apparatus the line is indexed forward to repeat the cycle.

As will be appreciated by those skilled in the art, the cutting and trimming steps of the present invention may be combined with a forming step to provide a cut and trim in place arrangement.

Although it has been convenient to describe the invention in relation to pots formed by a thermo forming process, the invention is equally applicable to pots formed by other means. It has been found that the present invention is particularly suitable for use in relation to pots produced by other means, including pots formed continuously from a melt phase extrudant.

The advantages provided by the present invention are accordingly independant of the method of forming the pots and the material from which they are formed provided the pots are suitable for undergoing the cutting and trimming steps described herein.

While it has been convenient to describe the invention herein in relation to the particularly preferred embodiment shown in the drawings, it is to be appreciated that other constructions and arrangements are also considered as falling within the scope of the invention. Various modifications, variations, alterations and/or additions to the constructions and arrangements described herein are also considered as falling within the scope and ambit of the present invention.

I claim:

1. Apparatus for separating a pot from a web of thermoplastics material and forming a substantially symmetrical flange thereon, said apparatus comprising a cutting and trimming die having lower die means including a mandrel for supporting said pot and upper die means incorporating first and second spaced cutting edges movable with respect to the mandrel wherein said first cutting edge is adapted for cooperating with a first cutting member mounted on said lower die means whereby to cut said pot from said web leaving a flange surrounding said pot and thereby facilitate the accurate location of said pot on said mandrel, and wherein a portion of said lower die means including said first cutting member, is movable relative to said mandrel whereby to enable a second cutting edge of said upper die means to cooperate with a second cutting member mounted on said lower die means whereby to trim the flange so forming a substantially symmetrical flange on said pot.

2. Apparatus according to claim 1 wherein said mandrel is mounted so as to remain substantially stationary within said apparatus.

3. Apparatus according to claim 2 wherein said first and second cutting edges are mounted concentrically relative to one another within said upper die means 4. Apparatus according to claim 1 wherein said mandrel forms a snug fit within a pot mounted thereon whereby to support and locate said pot during cutting and trimming thereof.

5. Apparatus according to claim 4 wherein said mandrel incorporates one or more vacuum channels adapted to facilitate the application of a vacuum to the interior of said pot whereby to more securely position said pot over said mandrel.

6. Apparatus according to claim 4 wherein said mandrel includes a push rod mounted in a passage in said mandrel to facilitate removal of a pot therefrom.

7. Apparatus according to claim 6 wherein the travel of said push rod is sufficient to facilitate ejection of the pot through said upper die means.

8. Apparatus according to claim 1 wherein said upper die means includes a cavity for receiving the body of a pot and wherein the walls of said cavity are wider towards the cavity mouth than towards the cavity interior.

9. Apparatus according to claim 8 wherein said pot projects more deeply into said cavity as said upper die means moves from the first cutting position to the second trimming position.

10. Apparatus according to claim 1 comprising a plurality of mandrels and cutting means adapted for simultaneously cutting and subsequently simultaneously trimming a plurality of pots.

11. Apparatus according to claim 1 including removal means to facilitate removal of the web from the lower die means following cutting.

12. Apparatus for separating a plurality of pots from a web of thermoplastics material and forming a substantially symmetrical flange on each of said pots said apparatus comprising a cutting and trimming die having lower die means including a plurality of mandrels each adapted for supporting a separate pot and upper die means incorporating a plurality of first and second spaced cutting edges each movable with respect to each of said mandrels wherein said first cutting edges are adapted for cooperating with a plurality of first cutting members mounted on said lower die means whereby to cut said pots from said web by a shearing action, leaving a flange surrounding each said pot to thereby facilitate the accurate location of each said pot on each said mandrel, and wherein a portion of said lower die means including each said first cutting member is movable relative to said mandrel whereby to enable a plurality of said second cutting edges to cooperate with a plurality of second cutting members mounted on said lower die means whereby to accurately trim the flange of each said pot, each of a pair of said first and second cutting edges being mounted concentrically relative to one another within said upper die means.

13. A method for separating a pot from a web of thermoplastics material and forming a substantially symmetrical flange thereon, the method comprising the steps of positioning said pot on a mandrel within a cutting and trimming die, cutting said pot from said web using a first cutting edge movable with respect to said mandrel to thereby facilitate the accurate location of said pot on said mandrel, and without disengaging the pot from the mandrel forming a substantially symmetrical flange on said pot by the action of a second cutting edge also movable with respect to said mandrel.

14. A method for forming an open top pot having a substantially symmetrical outwardly extending flange adapted for receiving a rolled edge of a metal closure, said method comprising the steps of passing a band of thermoplastics material through a heating device whereby to soften the material, forming a plurality of pots in the softened material at least one said pot having an outwardly extending flange and being connected to at least one other of said pots by a web of material, mounting said pot on a mandrel, cutting said pot from said web by the shearing action of a first cutting edge movable with respect to said mandrel cooperating with a first complementary cutting member whereby to cut said pot from said web and thereby facilitate the accurate location of said pot on said mandrel and thereafter trimming said pot by the shearing action of a second cutting edge movable with respect to said mandrel cooperating with a second complementary cutting member whereby to form a pot having a substantially symmetrical outwardly extending flange, and removing said pot from said mandrel.

* * * * *